(12) United States Patent
Burdgick et al.

(10) Patent No.: US 7,707,011 B2
(45) Date of Patent: Apr. 27, 2010

(54) METHOD TO OPTIMIZE PIPE LOAD LIMITS ON A TURBINE CASING

(75) Inventors: Steven Sebastian Burdgick, Schenectady, NY (US); Gene David Palmer, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 2116 days.

(21) Appl. No.: 10/317,192

(22) Filed: Dec. 12, 2002

(65) Prior Publication Data
US 2004/0117161 A1    Jun. 17, 2004

(51) Int. Cl.
G06F 17/50    (2006.01)
G06G 7/48    (2006.01)

(52) U.S. Cl. .............................................. 703/1; 703/7
(58) Field of Classification Search .................... 703/2, 703/1, 7
See application file for complete search history.

(56) References Cited

U.S. PATENT DOCUMENTS 5,781,430 A * 7/1998 Tsai ............................. 700/28
6,257,829 B1 * 7/2001 Seeley et al. ............. 415/213.1
6,901,809 B2 * 6/2005 Dong et al. .................... 73/789

OTHER PUBLICATIONS

Farrell L. Deibel, "Calculating Residual Manufacturing Stresses in Braze Joints Using ANSYS", IEEE Trnasactions on Electron Devices, vol. ED-34, No. 5, May 1987.*

Bishop et al, Adams, Response Surface Methodology (RSM) and Design of Experiments (DOE) Applied to Racecar Vehicle Dynamics Simulation and Development (26 pages) (printed by Applicant from Internet in Aug. 2002).*

Meier et al.: Determination of Limit Load by Means of Elastic-Plastic Finite Element Analysis as Exemplified by a Lateral Nozzle Subjected to Cyclic External Load; Chem. Eng. Technol. 22 (1999); pp. 216-219.*

Oi et al; 2nd MSC Worldwide Automotive Users' Conference Structural Analysis and Shape Optimization in Turbocharger Development; pp. 1-9; 2000.*

Pfizer v. Apotex F.3d (Fed. Cir. 2007).*

Cotter: A screening design for factorial experiments with interactions, Biometrics, 66, 2, p. 317, 1979.*

Bishop et al, Adams, Response Surface Methodology (RSM) and Design of Experiments (DOE) Applied to Racecar Vehicle Dynamics Simulation and Development (26 pages) (printed from Internet in Aug. 2002).

* cited by examiner

Primary Examiner—Hugh Jones
(74) Attorney, Agent, or Firm—Nixon & Vanderhye P.C.

(57) ABSTRACT

A method is described for establishing load limits for pipe connections to a turbine casing including the steps of: identifying a plurality of the pipe connections as key pipe load connections; developing transfer functions to model deformation of the casing based on loads applied to the key pipe connections; establishing individual load limits for each of the key pipe connections in the group by optimizing solutions to the transfer functions, and establishing a cumulative load limit for the group of key pipe load connections by optimizing solutions to the transfer functions.

11 Claims, 2 Drawing Sheets

Process Flowchart

METHOD TO OPTIMIZE PIPE LOAD LIMITS ON A TURBINE CASING

BACKGROUND OF THE INVENTION

The present invention relates to methods for avoiding excessive loads placed on turbine casings by pipes attached to the casing. In particular, the invention also relates to methods for optimizing the piping load limits for a turbine casing to minimize deformation of the casing due to the loads.

Deformation of a steam turbine casing can allow steam to leak around the seals at the tips of turbine buckets. This leakage reduces the amount of steam available to work on the downstream turbine buckets. Deformation of the casing can distort the seals which are intended to prevent the leakages of steam and gases.

Seals within a steam turbine generally include teeth static casing structure that interlace with the bucket covers. The gap between the teeth on the casing and the teeth on the buckets is narrow to prevent steam leakage over the covers of the blades. A steam turbine also has inter-stage seals between the stages of turbine buckets. The inter-stage seals prevent steam leakage through the turbine diaphragm packing that around the rotor shaft, and between each bucket stages. Deformation of the casing can distort the seals, and allow steam to escape through the seals and into the casing.

Excessive forces due to pipe connections on a turbine casing can occur during the assembly or operation of a turbine. Pipe loads tend to be high during turbine startup when the pipes and turbine heat up. The heating of the pipes and turbine casing during startup results in differential thermal expansions in the pipes and casing. The differential expansions between the pipes and casing apply loads on the casing that distort the casing shell. During turbine startup, distortions in the casing typically exaggerate the turbine bucket and seal clearances.

Excessive piping loads can also distort the turbine casing during turbine transient operations. Piping loads during transients, especially when cooling occurs in the pipes, tend to distort the turbine casing to reduce the clearances between the seals and buckets. If these clearances become too small, the stationary seals may "rub-out" as they scrap against the rotating buckets. Seals that rub-out do not provide effective sealing as they allow excessive steam leakage during steady state turbine operating conditions. Accordingly, excessive piping loads may damage and distort the seals between the casing and the buckets such that turbine performance is degraded.

Piping load limits are imposed on the turbine design to avoid excessive piping loads that unduly distort the casing. In the past, these limits have been based on empirical and historical information regarding prior piping loads on similar turbine casing. It was common for piping load limits to be developed using simple calculations of the loads on the casing. Conventional turbine casing design techniques were not particularly helpful in identifying those key pipe connections that distort the turbine casing (seals) or in establishing load limits for pipe connections. Accordingly, there is a long felt need for methods to establish pipe load limits on turbine casings that avoid excessive casing distortion.

BRIEF DESCRIPTION OF THE INVENTION

A method has been developed to determine piping load limits for individual pipe loads and groups of pipe loads. The method also identifies key piping loads and optimizes the pipe loads to minimize the turbine casing distortion.

In a first embodiment, the invention is a method for establishing load limits for pipe connections to a turbine casing comprising: identifying a plurality of the pipe connections as key pipe load connections; developing transfer functions to model deformation of the casing based on loads applied to the key pipe connections; establishing individual load limits for each of the key pipe connections in said group by optimizing solutions to the transfer functions, and establishing a cumulative load limit for the group of key pipe load connections by optimizing solutions to the transfer functions.

In a second embodiment, the invention is a method for establishing load limits for pipe connections a turbine casing comprising: modeling the casing as a finite element mesh model and modeling pipe loads as force vectors applied to the mesh model; identifying key pipe connections from the pipe connections which primarily cause casing deformation by analyzing the pipe loads applied to the mesh model; developing a transfer function representing a deflection of the casing in response to pipe loads applied at each of the key pipe connections; determining a maximum acceptable deflection of the casing; establishing a pipe load limit for each of the key pipe loads based on the transfer function and the maximum acceptable deflection, and establishing a pipe load limit for a plurality of the key pipe loads based on the transfer function and the maximum acceptable deflection.

DETAILED DESCRIPTION OF THE INVENTION

Figure 1:
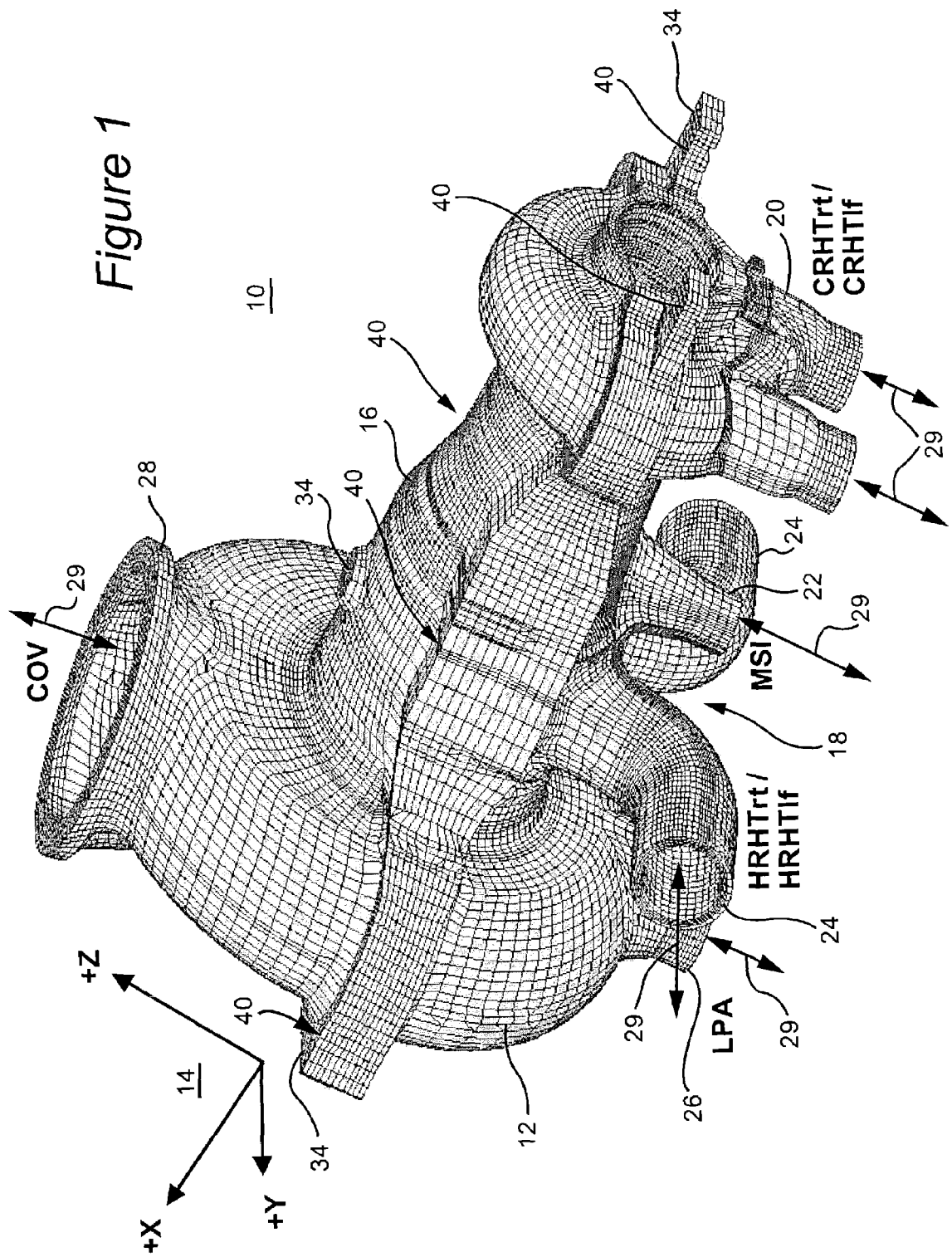
FIG. 1 is a perspective view of an exemplary steam turbine casing mesh model.

FIG. 1 shows an exemplary design of a steam turbine casing 10. The casing design 10 may be a solid-mesh model that is electronically stored in a computer system having software programs for finite element analysis and for transfer function optimization functions. The solid-mesh model of a mechanical structure is a conventional finite element analysis modeling tool that electronically represents the structure of a design, such as of a turbine casing. Such models may be based on, for example, a brick or tetrahedron mesh representation of the turbine casing. The model maps the casing design as an array of points 12 at the intersection of lines arranged on a Cartesian coordinate (X, Y, Z) axes 14.

Each point on the solid-mesh casing model represents the structural properties of a corresponding point in the actual casing. For example, each point 12 on the casing model represents the appropriate stiffness and material properties of the region of casing corresponding to the point. The representation is accomplished by storing in a computer database information, e.g., data and algorithms, that accurately model the structure of the casing at the point in the structural model.

The casing design 10 may be a split casing having lower 16 and upper 18 shells of the casing. The lower and upper shells house the internal turbine components, including rotating buckets and stationary seals. The casing also includes pipe connections such as the left and right cold steam reheat pipe connections (CRHTrt/CRHTlf) 20, main steam inlet connection (MSI) 22, hot return steam connection (HRTHrt/HRTHlf) 24, low pressure steam admission pipe connection (LPA) 26, and cross-over steam pipe connection (COV) 28. These pipes tend to be large, heavy and can apply large forces to the casing during operation when large amounts of steam flow through the pipes. Accordingly, the piping connections and their associated pipes are sources of loads and forces that act on the turbine casing 10.

The directional pipe forces 29 due to the piping can be simulated on the casing model as pipe load vectors. Each pipe force is a vector that has both a force magnitude, e.g. lbs. or kgs., and a direction. Each pipe force vector 29 represents the load applied to the casing at the pipe connection due to the pipe force. The pipe loads applied to the casing may apply a tensile or compression force to a pipe connection. Torsional forces may also be applied to a pipe connection by a force vector.

Figure 2:
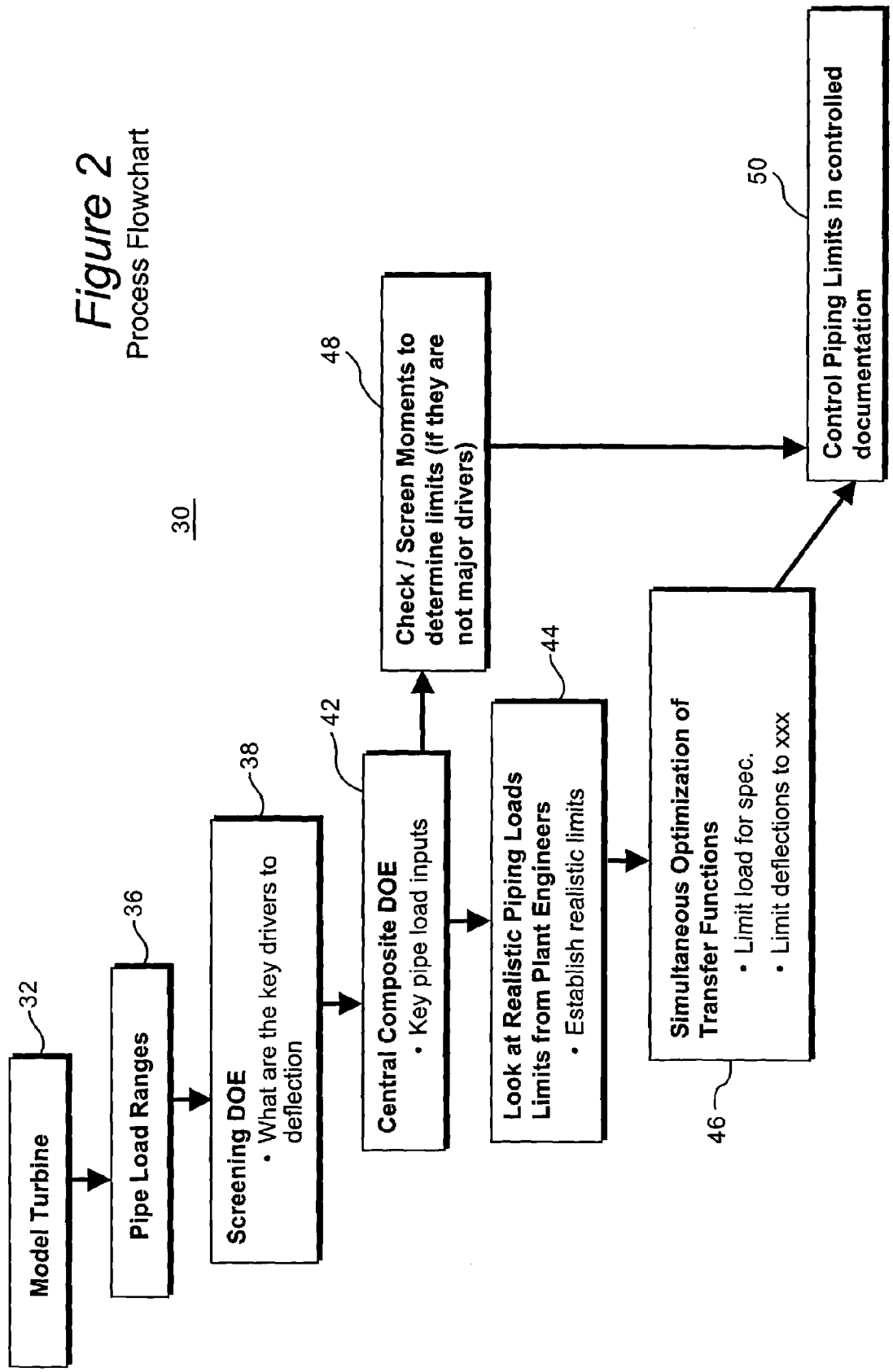
FIG. 2 is a flow chart of a method to optimize pipe connections to a turbine casing and establish pipe load limits.

FIG. 2 is a flow chart showing the steps of the methodology 30 to establish piping load limits for a turbine casing. The finite element model of the turbine casing and rages of possible vectored pipe forces are analyzed to determine the deformation on the casing due to those forces. The methodology 30 assists in establishing limits for piping loads for a turbine casing. These piping load limits may be applied during the design and operation of the turbine.

The methodology 30 optimizes pipe load limits to minimize turbine casing distortion, especially those distortions that affect the seals between the casing and the buckets or other rotating components of the turbine. The pipe loads limits are established to ensure that the casing deformation under piping loads will not cause the seals within the casing to exceed the proper design clearances for those seals. Limits are established for individual pipe connections and for groups of pipe connections.

The deformation of a turbine casing due to pipe loads are modeled by applying a conventional "physic based" finite element analyses to the mesh model of the casing design 10 and by applying pipe load vectors (force magnitude and force direction) to a finite element analysis. A finite element analysis evaluates each point on a casing with respect to neighboring points and the forces applied to those points. Conventional finite element analytical tools include commercially available software programs that enable evaluation of the loads and forces on wire frame models. These finite element tools are used here to model the deformation of a turbine casing due to pipe loads and forces that act on the casing.

The finite element analysis models the structural deformation of the casing due to multiple piping loads. The finite element analysis determines the shape of a casing under the influence of certain pipe loads. The analysis also yields the dimensions of the casing from which can be determined the clearances between the seals and buckets in the turbine.

A mesh model is made of the turbine casing design, in step 32. The model includes representations of the piping connections on the casing, although the location of the connections on the casing may be adjusted during the methodology to optimize piping loads on the casing. Further, the model may include constrains on the casing, such as fixed points corresponding to casing supports 34 (FIG. 1).

In step 36, the estimated ranges of the load vectors 29 for the piping loads are selected for the casing. These load vectors 29 are estimated based on typical piping loads for turbines having a similar unit size as does the turbine casing under design. The estimated ranges should include the pipe forces that occur during assembly of the turbine and all modes of turbine operation. In particular, the pipe load ranges should include the pipe loads that may occur during turbine start up and other transient operating modes.

To identify the key piping loads that are most influential in deforming the casing, a Screening Design of Experiments (DOE) process is performed to determine those key piping loads that most significantly affect casing distortion in the mesh model, in step 38. The screening DOE identifies the key pipe loads that are the key drivers to casing deflection. By varying the pipe loads applied to each of the piping connections, 20, 22, 24, 26 and 28, on the mesh model of the casing, the screening DOE process identifies those pipe connections that, when loaded, primarily deform the casing.

DOE and, in particular, DOE Screening Designs are conventional design methods used to evaluate the effects of multiple variable factors on a finite element model of a structure. DOE analytical tools, such as software programs, are commercially available and may be used in the context of this invention to evaluate pipe loads on a turbine casing.

The DOE Screening Design identifies those key pipe connections that, when loaded, cause the most deformation of the casing. Other pipe connections do not significantly deform the casing and may be ignored for purposes of setting pipe load limits, in step 48. Eliminating from further consideration those pipe connections (non-key pipe connections) that do not substantially deform the casing, reduce the complexity of the analysis of the piping loads. The non-key pipe load limits may be set to a predetermined load level, such as 5,000 lbs. (2,500 Kg), or to a level of no greater than twice the maximum pipe load determined for any of the key pipe connections.

To apply the DOE tools, transfer functions are developed to model the deformation response of the turbine casing to pipe loads. With respect to a turbine casing, the responses are the casing deflection at selected casing locations due to pipe loads. The controls are the pipe load vectors that are applied to the casing, and constraints, such as casing support points.

Casing deflection transfer functions are developed from the finite element analysis of the mesh model of the turbine casing, in step 37. These transfer functions may be linear equations that model the deflection of a point on the casing in response to one or more pipe loads and casing constraints. The transfer functions are developed based on the response of the mesh casing model to the load vectors. If linear equations do not accurately model the response of the mesh model to pipe loads, then higher order linear equations may be developed using conventional DOE tools.

The casing deflection transfer functions each have control variables inputs and a response variable as an output. The control variables are the pipe loads 29 applied to the key pipe connections. The response variable for a transfer function may be the casing deflection at a point 40 (FIG. 1) on the casing. The casing deflection may have a positive or negative distance value relative to the point on a non-deformed casing. The deflection may also have a direction corresponding to the deformation direction due to the pipe loads.

There may be a transfer function corresponding to each of several casing locations. These locations 40 may be at the ends and middle of the casing. These points 40 may be, for example, pairs of points at the front, middle and end of the casing, where each point of a point pair is on opposite sides of the casing. The casing points selected as the response variables may correspond to casing locations that are indicative of deformation of the turbine seals.

In step 42, a DOE Full Factorial or Central Composite analysis is performed on the transfer functions for each pipe location pipe loads. Testing of the key pipes, loads and directions are done to check the transfer function validity. A Central Composite DOE will take into account the entire design space, whereas a Partial factorial (Screening DOE) will only not take into account the entire design space but will be of reduced order and will have confounding interactions.

In step 44, the transfer functions developed in the DOE analysis are verified by comparing their results with the finite model analysis, and with model testing or historical empirical data on the casing. The model may be tested by conducting a finite element analysis on the model using pipe loads that have already been applied to the transfer functions. If the casing deflection values provided by the transfer functions for certain pipe loads are similar, e.g. within five percent, of the deflection values determined by a finite element analysis of those same pipe loads, then the transfer functions are verified and can be used to establish piping load limits.

Data on actual casing deformation under known piping loads can be collected by measuring the actual deformation of a casing in a test environment or by applying empirical data such as of deformation of similar casings due to actual pipe loads. The actual deformation of the casing is compared to the casing deflections predicted by the transfer functions as a second verification technique. The transfer functions should accurately model the deformation of the turbine casing in order to set accurately limits for piping loads. If the transfer functions do not accurately model the deformation, then the functions may be revised, e.g., by adding higher order controls, e.g., pipe loads that are squared, to the functions.

In step 46, pipe load limits may be established by optimizing the transfer functions developed using the DOE tools. Given the number of transfer functions and pipe connections, there may be an infinite number of solutions for each pipe connection loading that will meet a given casing deflection criteria. The casing deflections are based on a summation of all pipe loads, and especially key pipe loads. An optimization process is performed to identify the best pipe connection designs and the optimization is constrained by piping load limit criteria.

The optimization of pipe loads focuses on the key pipe forces that have been identified as causing the casing deformation that most influences the seal clearances. The optimization process searches for pipe load limits for each individual pipe connection. These load limits constrain the pipe loads on each pipe connection to some a range of force values (positive to negative).

Optimizing the pipe loading for all of the pipe loads could potentially involve an infinite number of solutions, and a tremendous and time consuming computational effort. To make the process manageable, the optimization process is simplified by focusing on key pipe loads. The non-key pipe loads are not key and do not substantially deform the casing, or at least do not substantially affect the seal clearance. Accordingly, the non-key pipe loads are ignored for purposes of optimizing the pipe loads.

Pipe load limits are established for each of the key pipe forces. The limits are established based on the optimization process which identifies the limits (or range of limits) that best satisfies the deformation constraints that are predetermined. The deformation constraints are the amount of permissible deflection of the casing at the points 40 that correspond to the transfer functions. The amount of permissible deflection is predetermined during the design of the turbine casing. The amount of permissible deflection may be a vector that has both magnitude (distance) and direction components.

When optimizing for individual pipe loads, an the other key pipe loads are assumed to be at their respective maximum values. Setting pipe load limits based on the aggregate of the maximum values of other key pipe forces ensures that the interaction of pipe forces does not cumulatively distort the casing such that seal clearances are out of acceptable range. Assuming that other key pipe loads are at a maximum value, when setting a pipe load limit ensures that the cumulative pipe forces do not interact to unduly distort the casing.

The maximum values are determined based on the ranges determined for the pipe loads initially and during the optimization process. The initial values for the maximum pipe loads are set as initial conditions for the optimization process. During the optimization process, the maximum pipe loads are varied. Thus, the optimization process is evaluating the transfer functions for a large number of maximum pipe load combinations in order to determine optimal maximum pipe loads. Moreover, the maximum pipe loads may each have directional components, such as the pipe connections may apply forces to the casing in opposite directions at various times during operation of the turbine. The optimization process evaluates each the maximum pipe loads for one or more load directions.

The methodology 30 of limiting piping connection forces may be conducted on several subsets of critical (and less critical) pipe forces. For example, key forces may be limited to a lower summation value, while other key forces, of lesser significance to distortion, may be limited to a higher total summation value.

In addition to determining individual pipe loads, the optimization process establishes cumulative pipe loads for groups of key pipe connections. For example, if a group of five key pipe connection forces are each limited to 15,000 Lbs. (+/−) in specific directions, then a pipe load limit is established for the absolute summation of the pipe forces of +40,000 Lbs. In view of the summation force limit, each of the individual five pipe loads are limited to 15,000 Lbs. The pipe load limits are selected such that some pipe load limits are in opposite directions or the individual forces of all five would be within the summation limit. The cumulative load limits for pipe groups allows for the individual pipe forces to "cancel" each other from the point of view of the turbine shell distortion.

The pipe load limits developed for individual pipe connections and for groups of pipe connections are documented, in step 50. The documentation sets forth the pipe load limits for the turbine and is incorporated into operator manuals for the turbine.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method for establishing load limits for pipe connections to a turbine casing comprising:
   a. identifying a plurality of the pipe connections as key pipe load connections on the turbine casing, wherein the key pipe load connections is a subset of all pipe load connections on the turbine casing;
   b. developing transfer functions to model deformation of the turbine casing based on loads applied to the key pipe connections;
   c. establishing individual load limits for each of the key pipe connections by optimizing solutions to the transfer functions, and
   d. establishing a cumulative load limit for the key pipe load connections by optimizing solutions to the transfer functions.

2. A method for establishing load limits as in claim 1 wherein steps (a) to (d) are performed using a Design of Experiments process.

3. A method for establishing load limits as in claim 1 wherein the key pipe connections are selected using a Screening Design of Experiments process.

4. A method for establishing load limits as in claim 1 wherein the key pipe connections are a subset of a group of pipe connections.

5. A method for establishing load limits as in claim 1 wherein the individual load limits are determined based on an assumption that other key pipe connections are at a maximum value.

6. A method for establishing load limits as in claim 1 wherein the transfer functions are developed based on a finite element analysis of a mesh model of the casing and vectored pipe loads applied to the mesh model.

7. A method for establishing load limits for pipe connections to a turbine casing comprising:
 a. modeling the turbine casing as a finite element mesh model of the casing and modeling pipe loads as force vectors applied to the mesh model;
 b. identifying key pipe connections from the pipe connections which primarily cause turbine casing deformation by analyzing the pipe loads applied to the mesh model, wherein the key pipe connections is a subset of all pipe connections on the turbine casing;
 c. developing a transfer function representing a deflection of the turbine casing in response to pipe loads applied at each of the key pipe connections;
 d. determining a maximum acceptable deflection of the turbine casing;
 e. establishing a pipe load limit for each of the key pipe loads based on the transfer function and the maximum acceptable deflection, and
 f. establishing a pipe load limit for a plurality of the key pipe loads based on the transfer function and the maximum acceptable deflection.

8. A method for establishing load limits as in claim 7 wherein steps (b) to (f) are performed using a Design of Experiments process.

9. A method for establishing load limits as in claim 7 wherein the key pipe connections are selected using a Screening Design of Experiments process.

10. A method for establishing load limits as in claim 7 wherein the key pipe connections are selected from a group of pipe connections, and the key pipe load connections has fewer pipe connections than the group of pipe connections.

11. A method for establishing load limits as in claim 7 wherein the individual load limits are determined based on an assumption that other key pipe connections are at a maximum value.

* * * * *